US011934156B2

(12) United States Patent
Favre-Bulle

(10) Patent No.: US 11,934,156 B2
(45) Date of Patent: Mar. 19, 2024

(54) CLOCKWORK SELECTOR MECHANISM

(71) Applicant: Omega SA, Biel/Bienne (CH)

(72) Inventor: Jérôme Favre-Bulle, La Sarraz (CH)

(73) Assignee: Omega SA, Biel/Bienne (CH)

( * ) Notice: Subject to any disclaimer, the term of this patent is extended or adjusted under 35 U.S.C. 154(b) by 269 days.

(21) Appl. No.: 17/380,501

(22) Filed: Jul. 20, 2021

(65) Prior Publication Data

US 2022/0075326 A1 Mar. 10, 2022

(30) Foreign Application Priority Data

Sep. 9, 2020 (EP) .................................... 20195302

(51) Int. Cl.
*G04F 7/08* (2006.01)

(52) U.S. Cl.
CPC .......... *G04F 7/0814* (2013.01); *G04F 7/0847* (2013.01)

(58) Field of Classification Search
None
See application file for complete search history.

(56) References Cited

U.S. PATENT DOCUMENTS

2012/0069717 A1 3/2012 Mertenat

FOREIGN PATENT DOCUMENTS

| | | |
|---|---|---|
| CH | 704 120 A2 | 5/2012 |
| CH | 704 120 B1 | 11/2015 |
| CN | 102692859 A | 9/2012 |
| CN | 106483822 A | 3/2017 |
| CN | 110275425 A | 9/2019 |
| EP | 1 760 548 A1 | 3/2007 |
| EP | 2 228 692 A1 | 9/2010 |

OTHER PUBLICATIONS

Notice of the Reason for Refusal dated Aug. 2, 2022 in Japanese Patent Application No. 2021-129494 (with English language translation), 7 pages.

European Search Report dated Mar. 17, 2021 in European Application No. 20195302.2, filed on Sep. 9, 2020 (with English Translation of Categories of cited documents), 3 pages.

Combined Chinese Office Action and Search Report dated Jan. 19, 2023, in corresponding Chinese Patent Application No. 202111056058.4 (with English Translation of Category of Cited Documents), 10 pages.

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A clockwork column selector mechanism, including a mobile with columns protruding above a base surface separated by clearances, forming slots along a profile, arranged to, in certain positions of the mobile, enable the insertion of a feeler-spindle into a clearance in a transverse direction substantially normal to the profile and parallel to the reference surface, and to, in other positions of the mobile, stop a feeler-spindle on a transverse surface of a column, at least one column including an intermediate transverse stopping surface constituting a stop bearing surface of a feeler-spindle and enable a partial insertion of a feeler-spindle in the thickness of one the slot, and which is located, in a transverse direction, between the geometric envelopes of two end transverse surfaces transversely delimiting this column.

13 Claims, 10 Drawing Sheets

CLOCKWORK SELECTOR MECHANISM

CROSS-REFERENCE TO RELATED APPLICATION

This application claims priority to European Patent Application No. 20195302.3 filed on Sep. 9, 2020, the entire disclosure of which is hereby incorporated herein by reference.

FIELD OF THE INVENTION

The invention concerns a clockwork column selector mechanism, including a mobile including a plurality of columns protruding above a base surface and separated by clearances, said columns and said clearances together forming slots extending along a profile, arranged to, in certain positions of said mobile, enable the insertion of a feeler-spindle or a pin into one said clearance in a transverse direction substantially normal to said profile and substantially parallel to said reference surface, and to, in other positions of said mobile, stop a feeler-spindle or a pin on a transverse surface of one said column.

The invention also concerns a chronograph mechanism, including at least one such selector mechanism, controlled by a control means maneuverable by the user.

The invention also concerns a timepiece, in particular a watch, comprising at least one horological movement, and at least one chronograph mechanism including at least one such selector mechanism, controlled by control means accessible to the user.

The invention concerns the field of clockwork mechanisms with complications, such as in particular chronograph mechanisms or striking mechanisms.

BACKGROUND OF THE INVENTION

The clockwork mechanisms with complications, such as chronograph mechanisms or striking mechanisms, commonly use function selection mechanisms including crenellated column wheels, blocking or enabling the insertion of a feeler-spindle into a slot from the outside of the column wheel.

Some complex mechanisms implement column wheels with several levels, such as for example the striking mechanism which is described by the document EP2498146B1 in the name of MONTRES BREGUET, which includes means for selecting a mode with multi-stage column wheel of superimposed ratchets. These mechanisms, effective for providing several functionalities, are nevertheless very bulky, and the total thickness thereof generally does not allow them to be housed into a watch of common dimensions.

The document EP1760550 in the name of MONTRES JOURNE describes a similar column wheel mechanism whose outer profile is stepped for the control of different functions according to the rotation pitch of the wheel.

SUMMARY OF THE INVENTION

The invention proposes to develop a selector mechanism of small space requirement in thickness, capable of executing different functions, and in particular of developing a mobile with stopping surfaces both on the outside and on the inside of the slots of a mobile with columns, in particular but not limited to a column wheel.

BRIEF DESCRIPTION OF THE DRAWINGS

Other features and advantages of the invention will appear on reading the following detailed description, with reference to the appended drawings, where:

FIGS. 2 and 5 illustrate the "start" position, running chronograph, the pin is in a clearance between two neighboring columns, without contact with either of them;

FIGS. 3 and 6 illustrate the "stop" position, stopped chronograph, the pin is in a clearance of a column, without contact;

FIGS. 4 and 7 illustrate the "reset" position, chronograph after resetting, the pin is bearing on the inner end surface of a column;

DETAILED DESCRIPTION OF THE PREFERRED EMBODIMENTS

Figure 1:
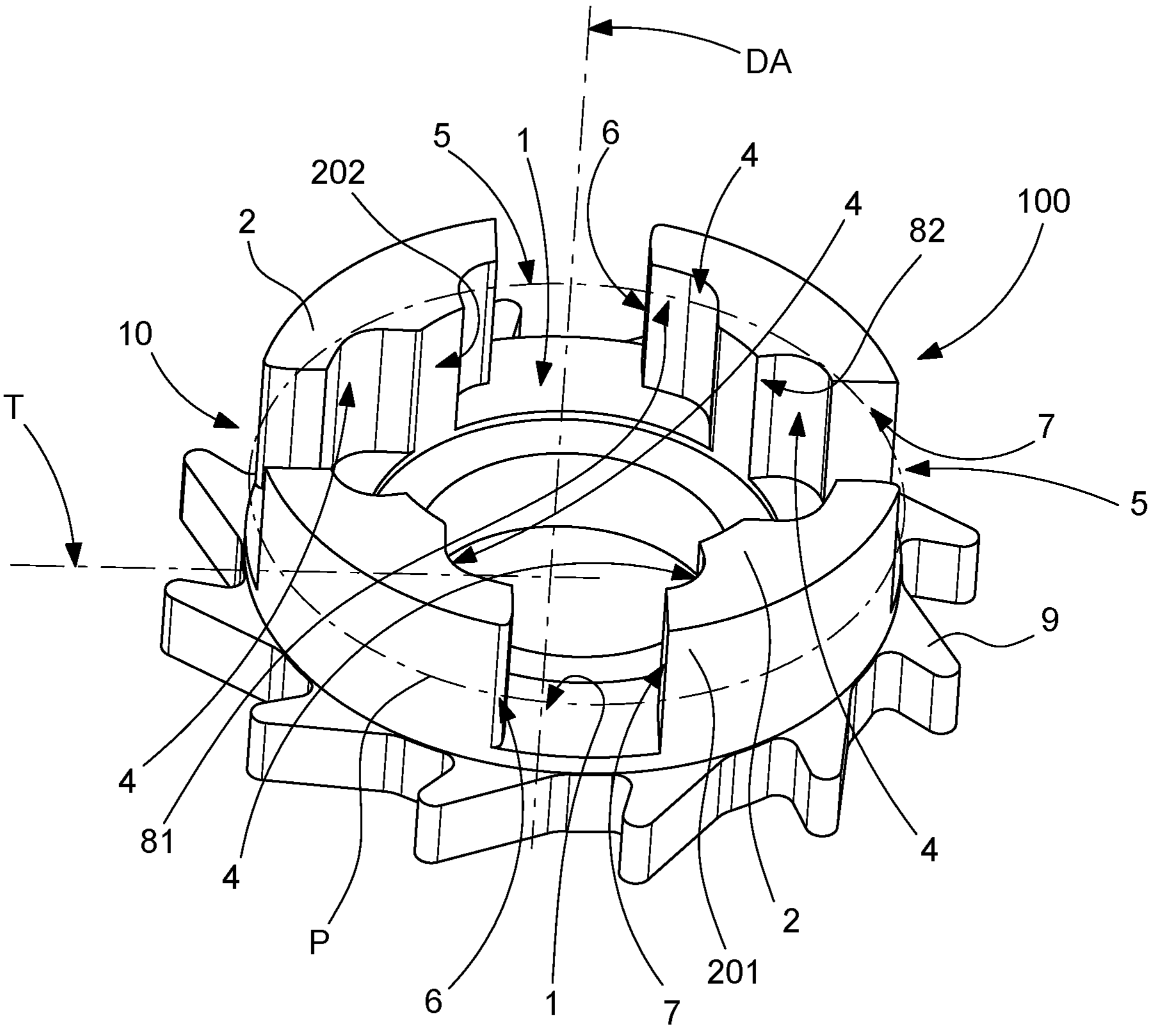
FIG. 1 represents, schematically, and in perspective, a clockwork selector mechanism according to the invention, in a variant where this selector mechanism is a column wheel; this column wheel conventionally includes on the periphery thereof slots with alternating columns, protruding from a base surface in an axial direction, and clearances between these columns, so as to prohibit or enable the radial insertion of a rocker lever beak, a finger or the like, depending on the angular position of the column wheel. According to the invention, the inner surface of the columns includes intermediate stopping surfaces arranged to enable a partial insertion of a feeler-spindle or a pin into the clearance of a slot, between the outer and inner envelope surfaces of the columns; in this particular non-limiting execution, these intermediate stopping surfaces are part of a profile projection which is substantially complementary to that of a pin.

The invention concerns a clockwork column selector mechanism 100, which includes a mobile including a plurality of columns 2.

These columns 2 are protruding above a base surface 1 and separated by clearances 5, the columns 2 and the clearances 5 together forming slots 10 extending along a profile P. The figures illustrate a configuration of column wheel where the profile P is circular, but this profile could also be linear, or otherwise, without departing from the invention.

These slots 10 are arranged to, in certain positions of the mobile, enable the insertion of a feeler-spindle or a pin into a clearance 5 in a transverse direction T substantially normal to said profile P and substantially parallel to the reference surface 1, and to, in other positions of the mobile, stop a feeler-spindle or a pin on a transverse stopping surface 81, 201, 202 of a column 2.

In the illustrated case of a circular profile P, the transverse direction T is a radial originating from the axis of the mobile.

According to the invention, at least one column 2 includes at least one intermediate transverse stopping surface 81, which is arranged to constitute a stop bearing surface of a feeler-spindle or a pin and to enable a partial insertion of a feeler-spindle or a pin in the thickness of the slot 10, and which is located, in a transverse direction T, between the geometric envelopes of two end transverse surfaces 201, 202, which transversely delimit the column 2.

More specifically, each column 2 which includes at least one intermediate transverse stopping surface 81 has a variable thickness in the transverse direction T, and includes at least one projection 4, which is arranged to retain a feeler-spindle, a finger, or a pin 3, or the like, of a clockwork mechanism arranged to cooperate with the selector mechanism 100, the projection 4 including the intermediate stopping surface 81 and a front stopping surface 82 in the direction of the profile P.

More particularly, the projection 4 is arranged to retain a feeler-spindle or a pin in at least one orientation in the direction of the profile P. More particularly, the projection 4 is arranged to retain a feeler-spindle or a pin in a single orientation in the direction of said profile P.

More particularly, a column 2 including a projection 4 includes at least two opposite projections 4, each arranged to retain a feeler-spindle or a pin in one orientation opposite to the other.

This embodiment with at least one projection formed in at least one column, more particularly each column, is advantageous because it is particularly compact.

However, it is possible, for timepieces which are larger than conventional watches, for example marine chronometers, watches with large complications, or clocks, to design the selector mechanism 100 in a different manner, for example by doubling the columns, some columns called outer columns ensuring the external stop function on a first side called outer side of the selector mechanism 100, and other columns called inner columns ensuring the internal stop function on a second side called inner side of the selector mechanism 100; the geometry of these inner columns is then adapted to ensure the functionality of such projections, and, for example, the inner columns can each consist of several pins 88, 89, one of which 88 includes an intermediate stopping surface 81 and the other 89 a front stopping surface 82, and possibly an end transverse surface 202.

Figure 11:
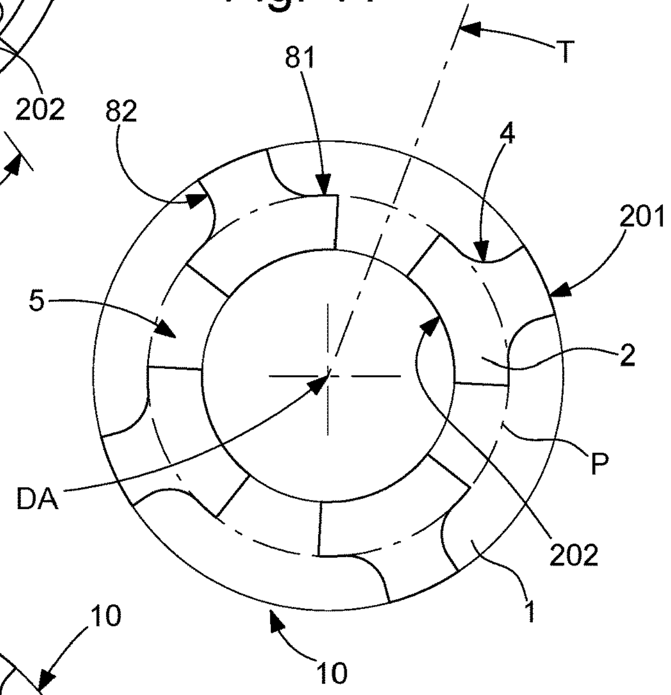
FIG. 11 represents, similarly to FIG. 1, a variant of selector mechanism in the reverse configuration, where the projections are disposed on the outer side of the column wheel while the stopping surfaces on the inner side are smooth.
Figure 12:
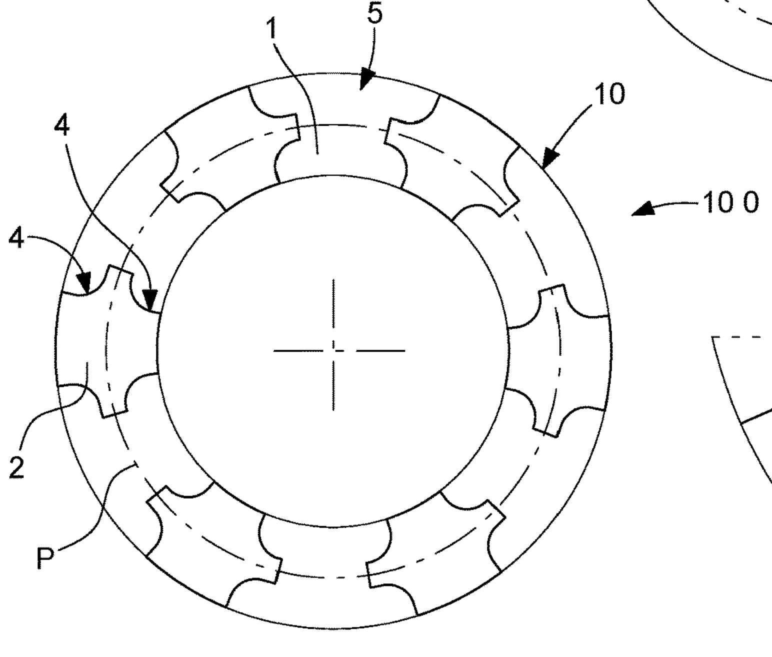
FIG. 12 represents, similarly to FIG. 1, a variant of selector mechanism where the columns include projections both on the outer side and on the inner side.

Naturally, the projections can be, according to the desired functionality, located inside the profile as in the variant which is illustrated by FIG. 1, or outside the profile as in the variant which is illustrated by FIG. 11, or else on either side of the profile as in the variant which is illustrated by FIG. 12.

Figure 13:
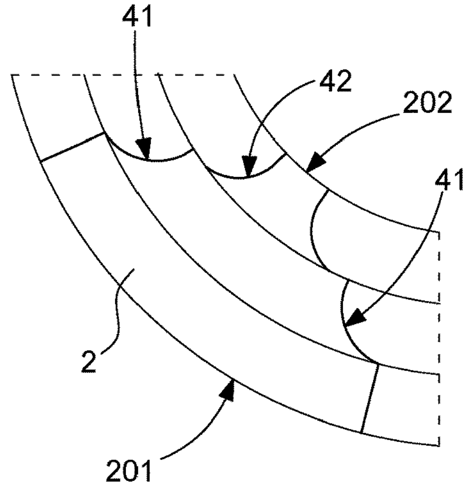
FIG. 13 represents, partially and similarly to FIG. 1, a variant of selector mechanism where the column includes stepped projections radially on the inner side of the column wheel.

The projections 4 can also be stepped, as shown in FIG. 13, where successive projections 41 and 42 are each arranged for stopping a mobile in a particular position.

The figures illustrate circular column wheels, this arrangement is compact and advantageous, and meets the majority of horological functionalities. It is however possible to arrange on different radii: the different end transverse surfaces 201, and/or the different end transverse surfaces 202, and/or the different intermediate transverse stopping surfaces 81.

One understands that this selector mechanism 100 is, thus, arranged to define several transverse positions for inserting a maneuvering or control member: front stopping of a stop on one of the end transverse surfaces 201, 202, complete transverse travel through the clearance 5, limited partial transverse travel in stop bearing on a surface of the projection 4. Of course, if the same column 2 includes several projections 4 of different transverse depth, or if several columns 2 include several projections 4 of different transverse depth, it is possible to have more control positions.

More particularly, the mobile extends along a closed profile P, and the slots 10 extend between an outer envelope geometric surface defined by the outer end transverse surfaces 201 of the columns 2, and an inner envelope geometric surface defined by the inner end transverse surfaces 202 of the columns 2.

More particularly, the closed profile P is circular, and the outer envelope geometric surface and the inner envelope geometric surface are cylindrical and coaxial.

In a variant, the profile P is closed, and at least one projection 4 is inside said mobile. More particularly, each projection 4 is inside the mobile.

In another variant, the profile P is closed, and at least one projection 4 is outside the mobile. More particularly, each projection 4 is outside the mobile.

Figure 14:
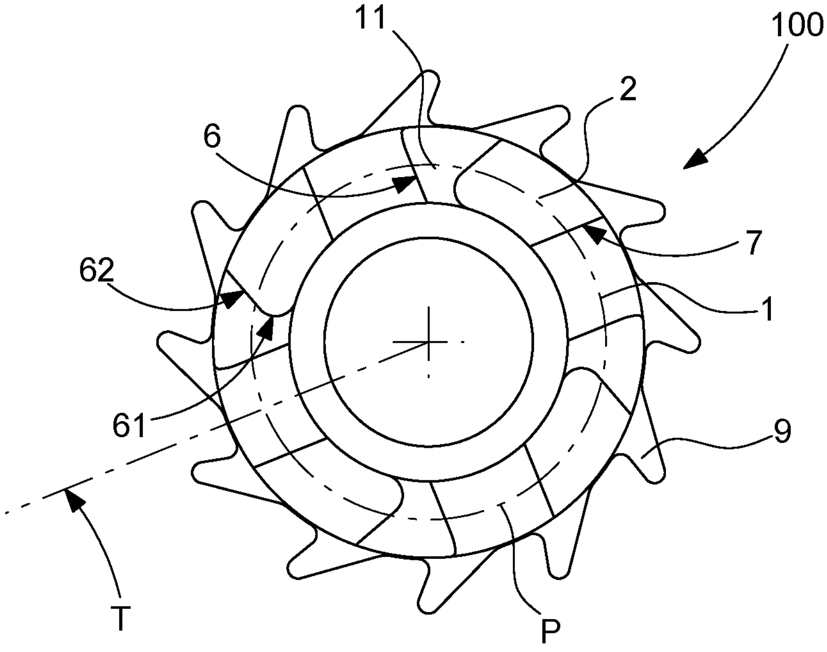
FIG. 14 represents, similarly to FIG. 1, a variant of the selector mechanism where the columns include stepped bearings in the axial direction and including intermediate stopping surfaces making projections.
Figure 15:
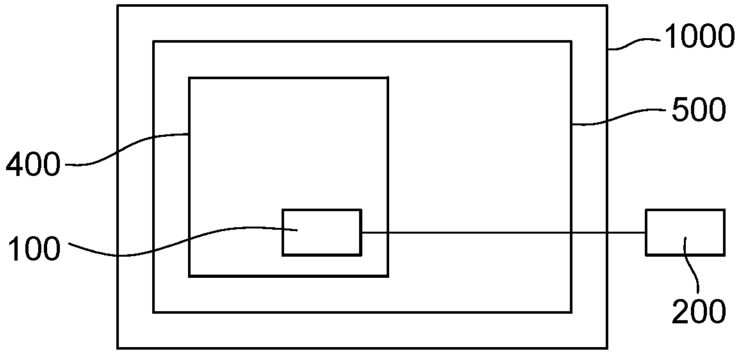
FIG. 15 is a block diagram which represents a timepiece, in particular a watch, including a horological movement, and a chronograph mechanism including a selector mechanism according to the invention, controlled by control means accessible to the user.

In a variant, at least one column 2 includes at least one bearing 11 in the height thereof, in an axial direction DA perpendicular to the base surface 1. Such a variant allows a greater number of combinations. Even more particularly, the bearing 11 is limited by an intermediate stopping surface 61 and/or 62 according to the invention. However, this variant, shown schematically in FIG. 14, requires a greater height, which is not always possible.

The invention also concerns a chronograph mechanism 400 including at least one such selector mechanism 100, controlled by a control means 200 maneuverable by the user. More particularly, this chronograph mechanism 500 includes a minute counter disconnecting control 22, which allows disengaging, from the minute mobile 40, the drive finger of the minute counter 360, as shown in FIG. 4, whereas in FIGS. 2 and 3 this drive finger 360 is engaged with the wolf tooth wheel 41 of the minute counter 40.

This minute counter disconnecting control 22 carries a pin 3 which is arranged to, depending on the position of the mobile, in a starting position, hereinafter called "start", corresponding to the running of the chronograph, remain at least partially in a clearance 5 between two columns 2, or in a stop position corresponding to stopping the chronograph, cooperate in bearing engagement with a projection 4, or in a reset position for resetting the chronograph, bear on an end transverse surface 201, 202 of a column 2.

The clearance 5 between two neighboring columns 2 is delimited by edge surfaces 6 and 7 of these two columns 2.

The beak 21 of the connecting lever 210 is arranged to cooperate, or in abutment bearing on an outer end transverse surface 201 of column 2, or in the position of insertion into a clearance 5.

This chronograph mechanism 400, illustrated by the figures, includes such a selector mechanism 100, herein a column wheel, whose profile P is circular, and includes the constituents listed according to the nomenclature at the end of the present description.

Figure 2:
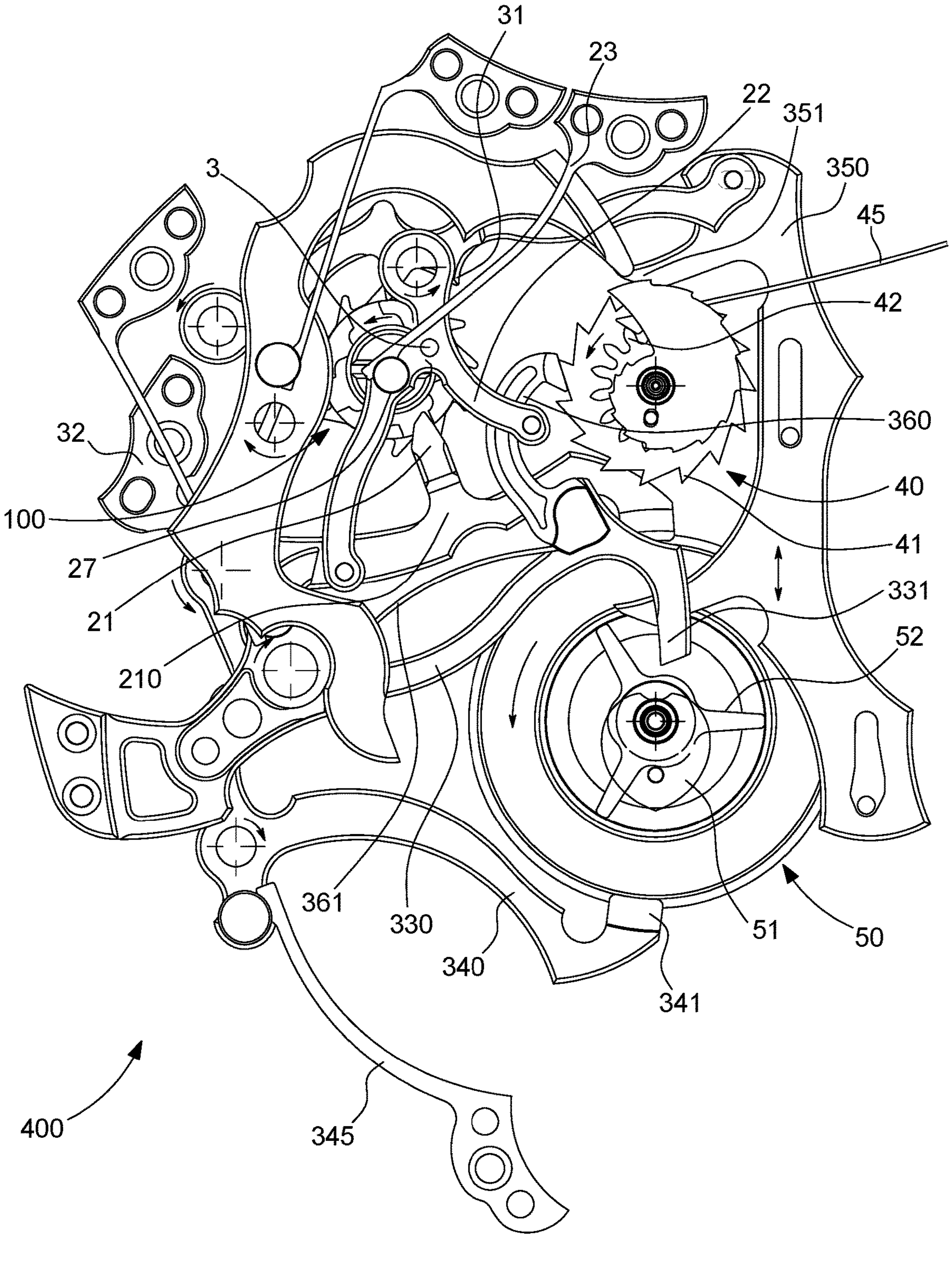
FIGS. 2 to 4, and the respective details thereof in FIGS. 5 to 7, illustrate the three significant phases of operation of a chronograph mechanism including the selector mechanism of FIG. 1, and show the operation, with the cooperation, inside the column wheel, between the latter and a pin carried by a minute counter disconnecting control of the chronograph, the column wheel rotating counterclockwise.
Figure 3:
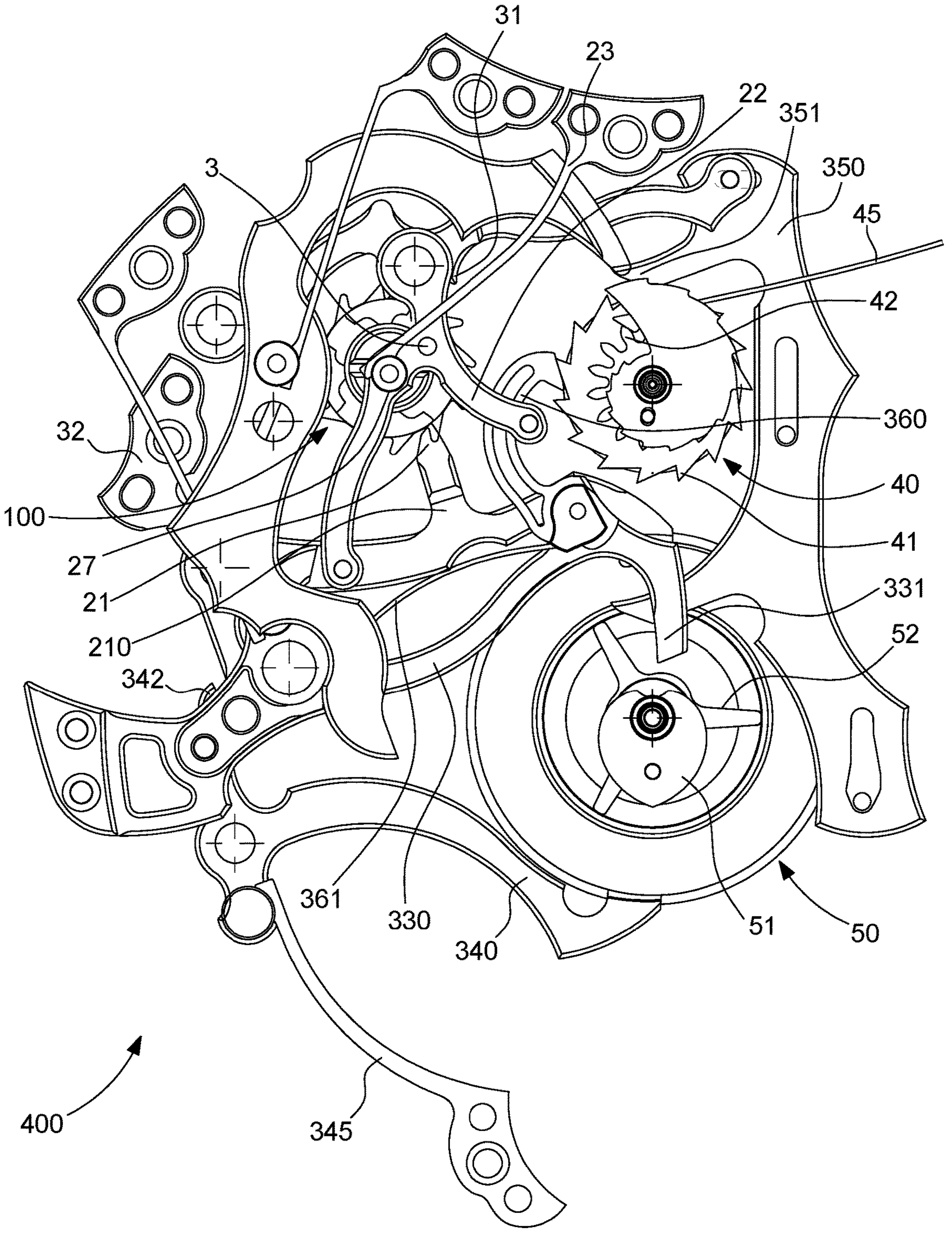
Figure 4:
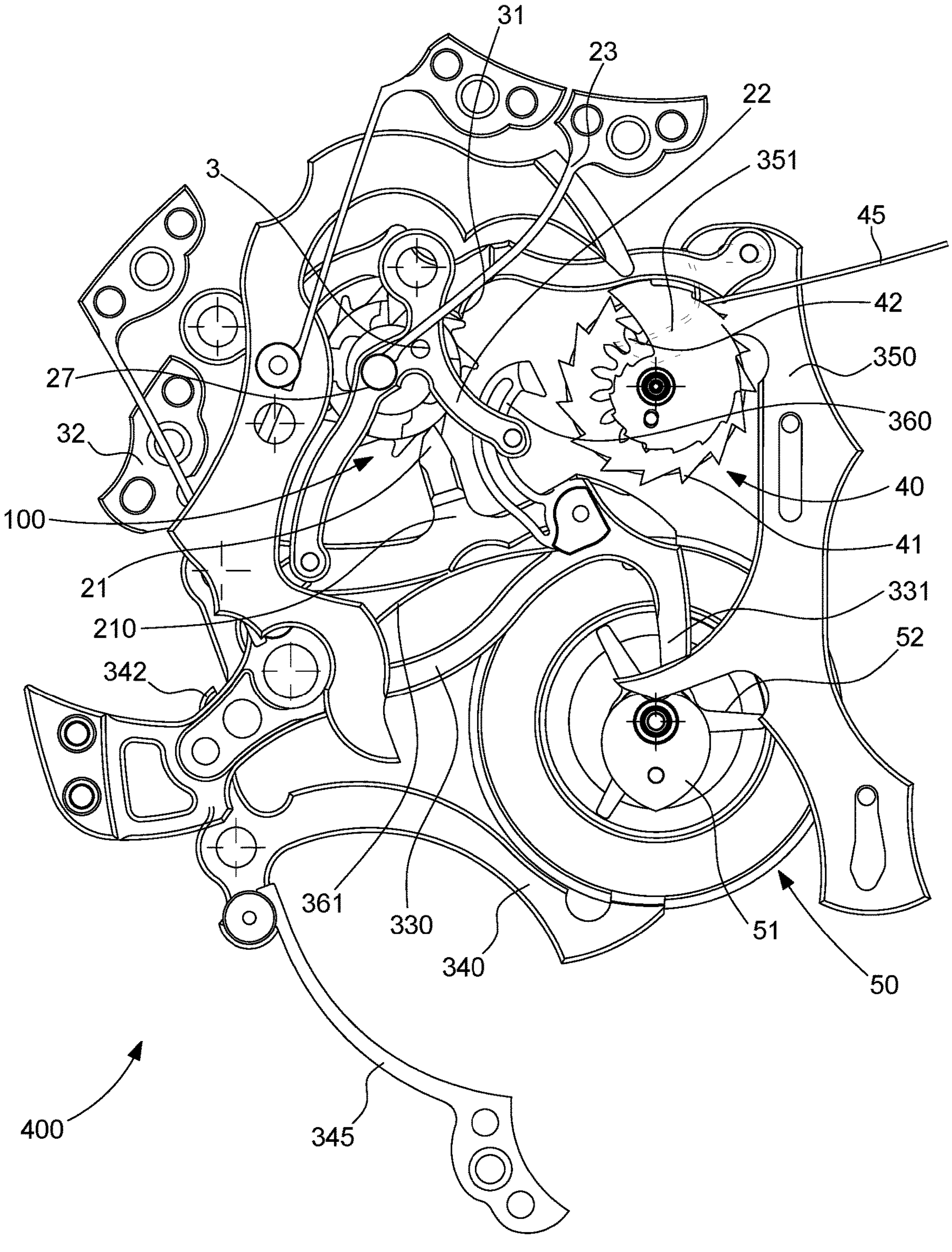
Figure 5:
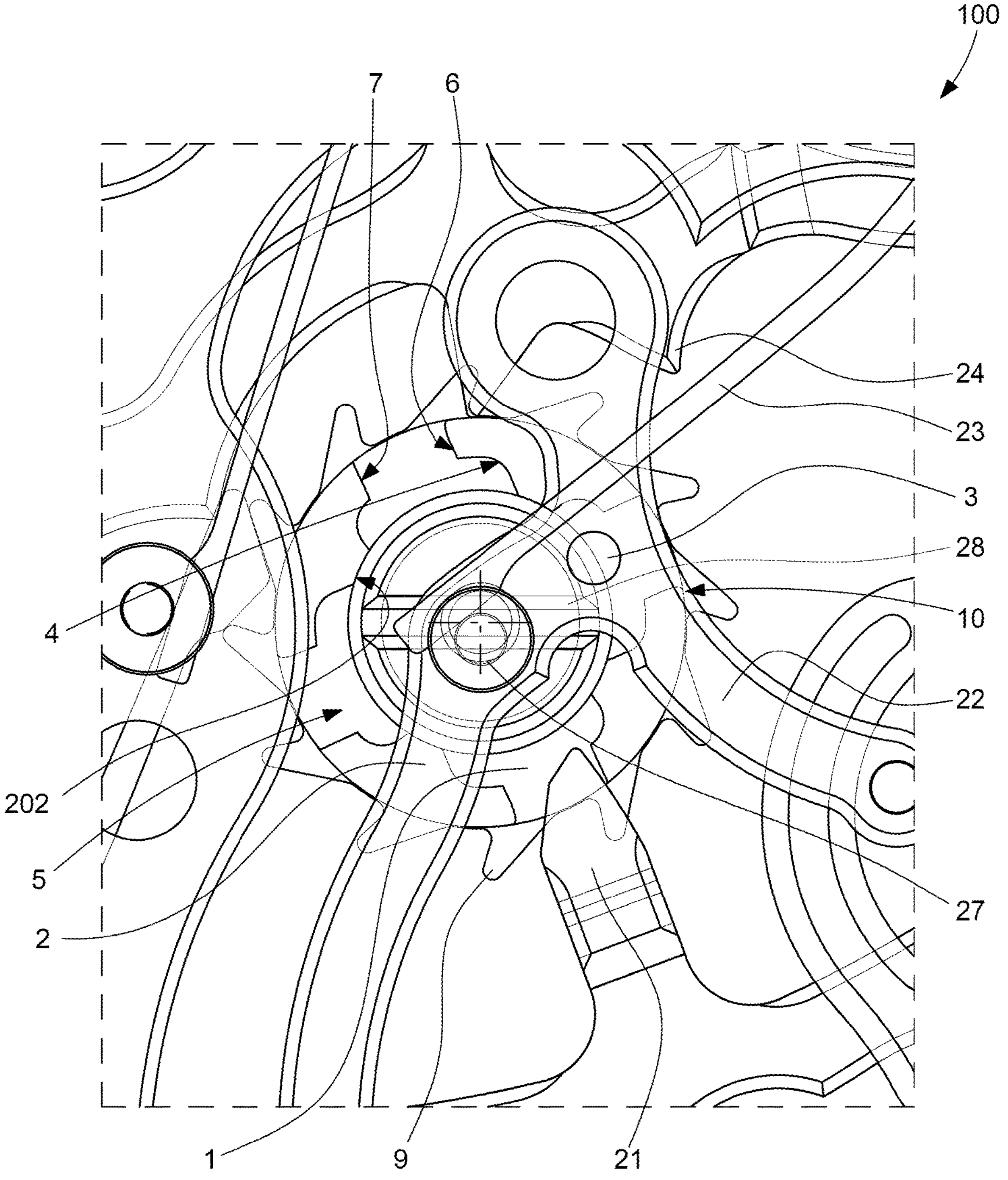
Figure 6:
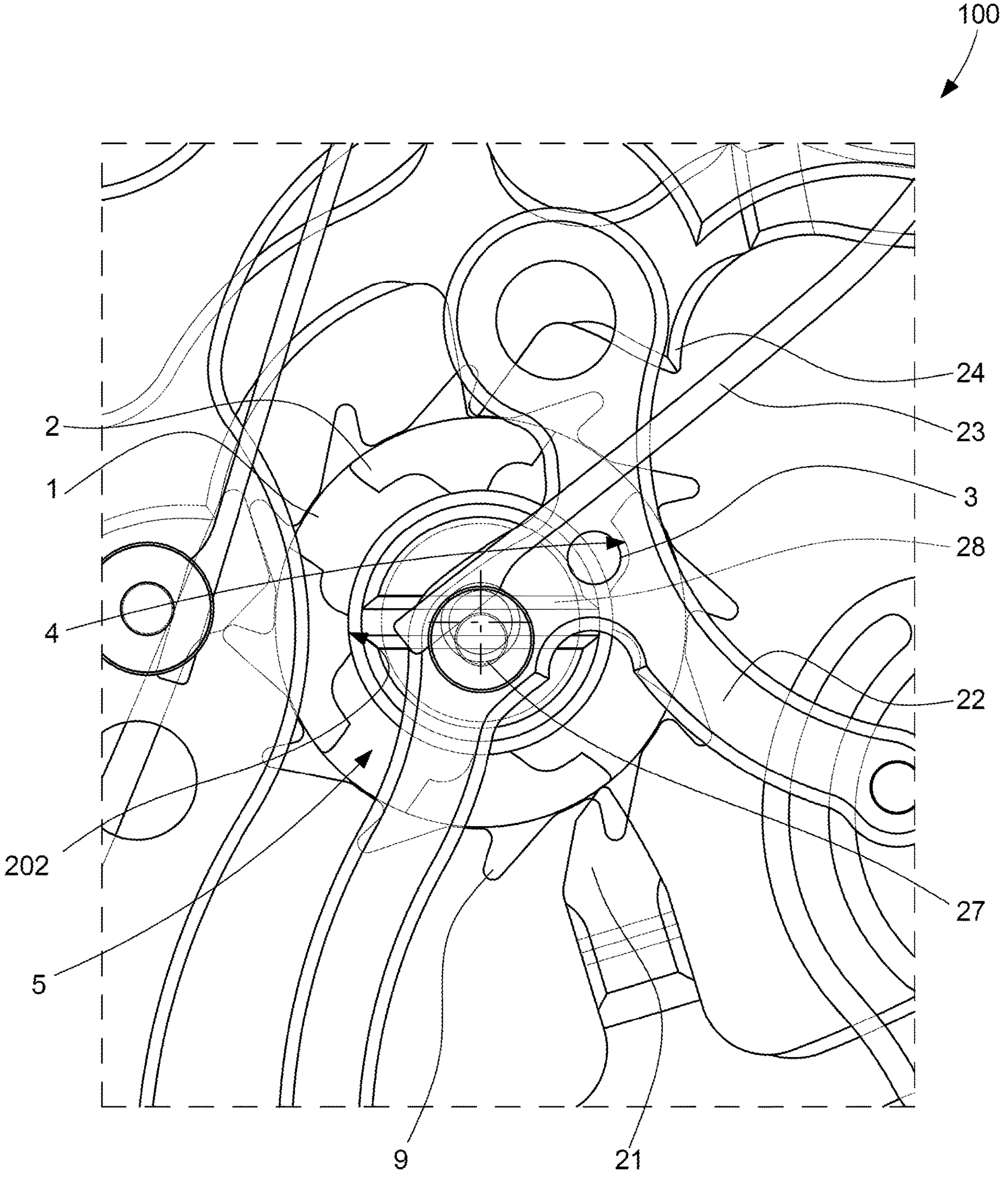
Figure 7:
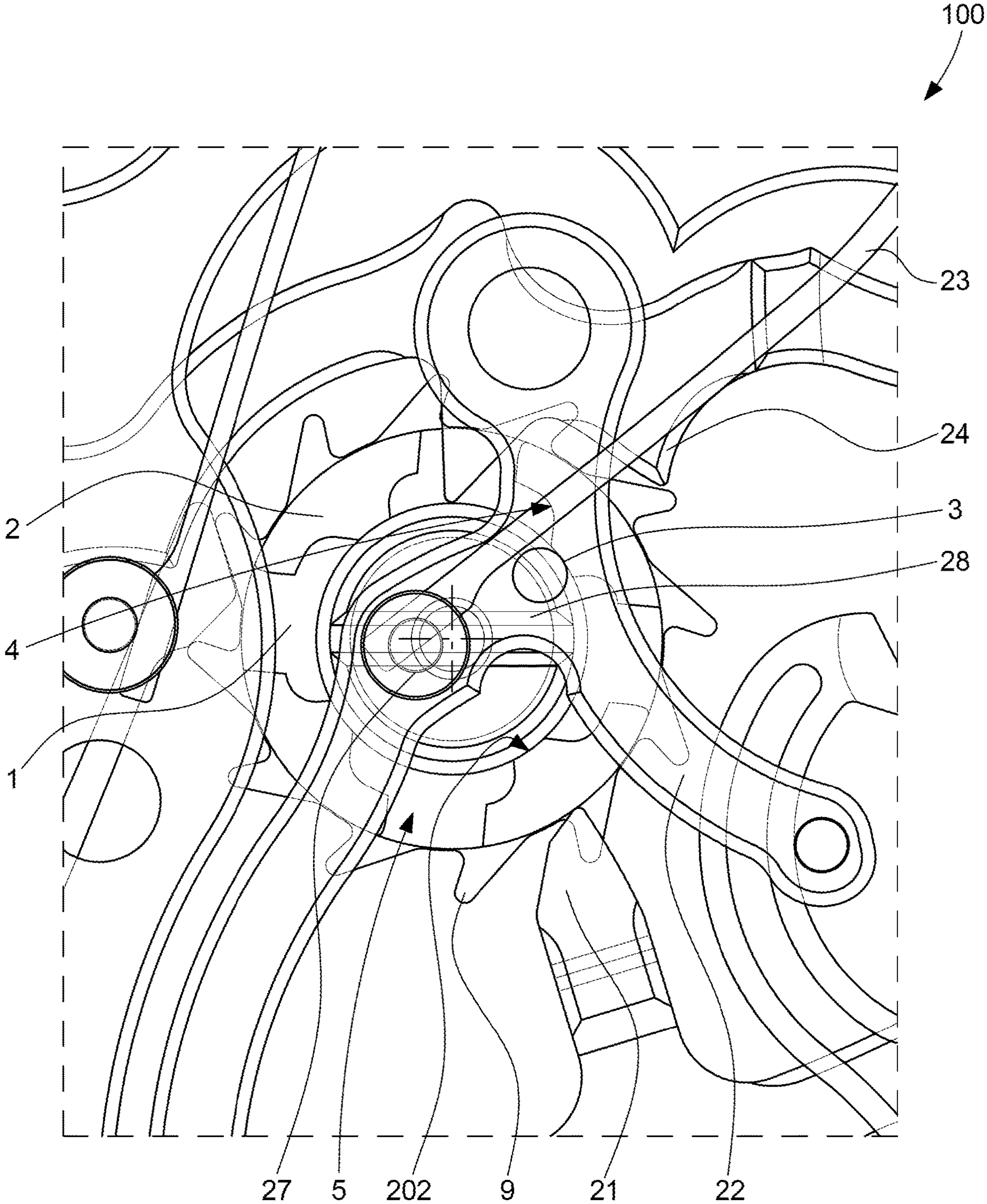
Figure 8:
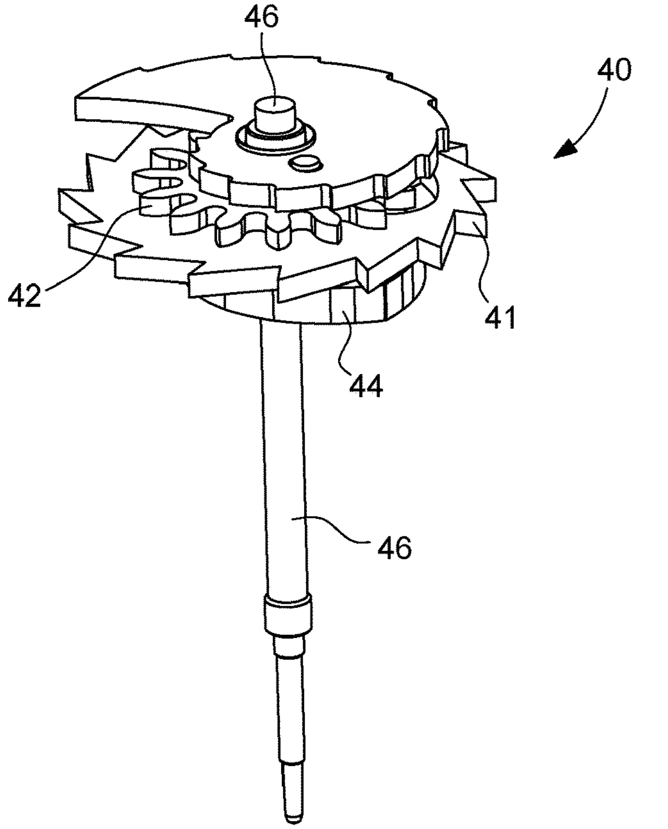
FIG. 8 represents, schematically and in perspective, the mobile minute counter that the chronograph mechanism of FIGS. 2 to 7 includes, with, mounted in superposition on a shaft and secured in rotation, a minute heart-piece, a wolf tooth minute counter wheel, a minute counter pinion, and a minute snail.
Figure 9:
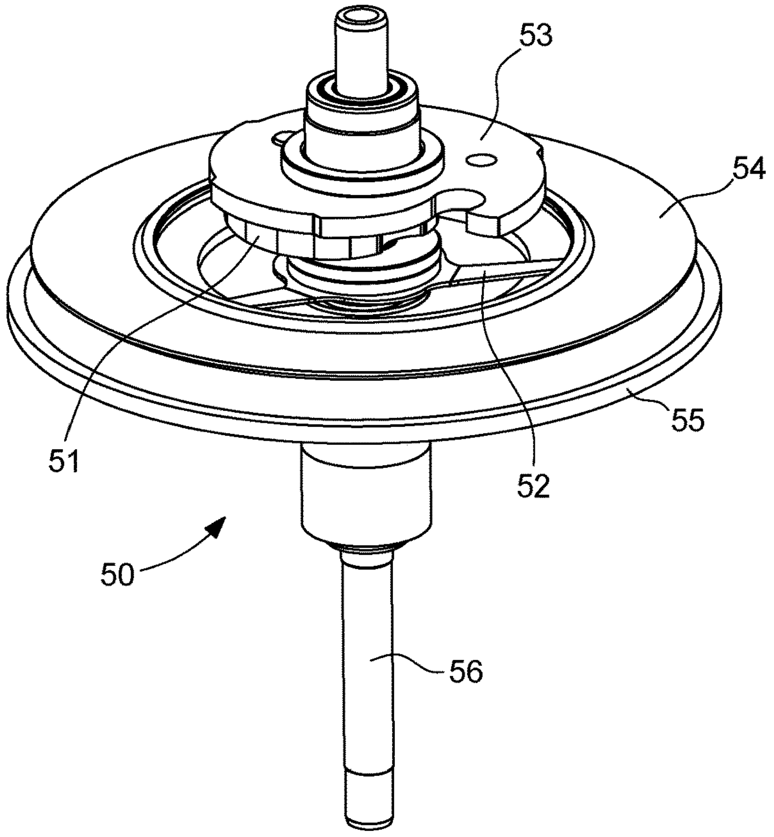
FIG. 9 represents, schematically and in perspective, the chronograph mobile that the chronograph mechanism of FIGS. 2 to 7 includes, with, mounted in superposition on a shaft and secured in rotation, a chronograph wheel and second pinion assembly, a connecting disc, a chronograph wheel friction spring, a chronograph heart-piece, and a chronograph cam.
Figure 10:
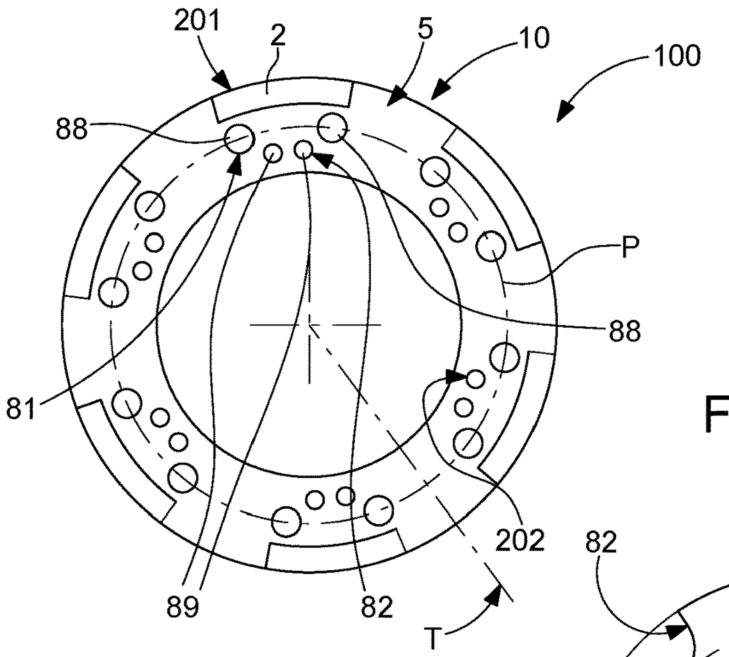
FIG. 10 represents, similarly to FIG. 1, a variant of selector mechanism where the column only occupies the outside of the column wheel, the stopping surfaces on the inner side being constituted by pins.

FIGS. 2 to 4, and the respective details thereof in FIGS. 5 to 7, illustrate the three significant phases of operation of this chronograph mechanism 400, and show the operation, with the pin 3 of the minute counter disconnecting control 22 coming in cooperation with the inside of the column wheel, said column wheel rotating counterclockwise:

FIGS. 2 and 5 illustrate the "start" position, running chronograph, the pin 3 is in a clearance 5 between two neighboring columns, without contact with either of them;

FIGS. 3 and 6 illustrate the "stop" position, stopped chronograph, the pin 3 is stopped in a projection 4 of a column 2, where it is blocked radially and tangentially;

FIGS. 4 and 7 illustrate the "reset" position, chronograph after resetting, the pin 3 is bearing on the inner end surface 202 of a column 2;

The invention also concerns a timepiece 1000, in particular a watch, including at least one horological movement 500, and at least one chronograph mechanism 400 including at least one selector mechanism 100 according to the invention, controlled by control means 200 accessible to the user.

In short, the invention allows work on a single column level, which is advantageous for the space requirement in thickness of the mechanism in which the selector mechanism 100 is incorporated according to the invention, and by using the available space, in particularly the inside of the columns 2, as shown in FIG. 1, for particular functionalities.

The selector mechanism 100 according to the invention lends itself well to traditional manufacture by milling, and the cost thereof is therefore very moderate.

1 Base surface
2 Column
3 Minute counter disconnecting control pin
4 Column projection
5 Clearance between columns 2
6 Edge surface of column 2
7 Edge surface of column 2
81 Intermediate stopping surface of the projection 4 transversely
82 Front stopping surface of the projection 4 according to the profile P
9 Column wheel toothing
10 Envelope surface of the outer end transverse surfaces 201
11 Bearing
61 First limiting surface of bearing 11
62 Second limiting surface of bearing 11
21 Beak of the clutch lever 210
22 Disconnecting control of the minute counter 40
23 Minute counter disconnecting control spring
24 Hammer control
27 Bearing post of the disconnecting control spring 24 (height)
28 Column wheel screw (in the rear portion)
32 Column wheel jumper
40 Minute counter mobile
41 Minute counter wheel
42 Minute counter pinion
44 Minute heart-piece
45 Minute counter jumper
46 Mobile shaft of the minute counter 40
50 Chronograph mobile
51 Chronograph mobile heart-piece
52 Chronograph wheel friction spring
53 Chronograph mobile cam
54 Connecting disc of the mobile 50
55 Chronograph wheel and second pinion
56 Shaft of chronograph mobile 50
210 Connecting lever
330 Minute counter rocker lever
331 Feeler-spindle of the minute counter rocker lever
340 Connecting rocker lever
342 Heel of the connecting rocker lever
345 Spring of the connecting rocker lever
350 Hammer
351 Hammer pane
360 Minute counter drive finger
361 Minute counter finger spring

The invention claimed is:

1. A clockwork column selector mechanism, comprising:

a mobile including a plurality of columns protruding above a base surface and separated by clearances, said columns and said clearances together forming slots extending along a profile, arranged to, in certain positions of said mobile, enable the insertion of a feeler-spindle or a pin into one said clearance in a transverse direction substantially normal to said profile and substantially parallel to said base surface, and to, in other positions of said mobile, stop a feeler-spindle or a pin on a transverse surface of a first column of said plurality of columns, wherein at least said first column includes at least one intermediate transverse stopping surface which is arranged to constitute a stop bearing surface of one said feeler-spindle or one said pin and enable a partial insertion of one said feeler-spindle or one said pin in the thickness of one said slot, and which is located, in said transverse direction, between the geometric envelopes of two end transverse surfaces which transversely delimit said first column, wherein each column of the plurality of columns that includes at least one said intermediate transverse stopping surface has a variable thickness in said transverse direction, and includes at least one projection arranged to retain said feeler-spindle or said pin of a clockwork mechanism arranged to cooperate with said selector mechanism, said projection including said intermediate stopping surface and a front stopping surface in the direction of said profile, and wherein said first column includes at least two of said projections, each arranged to retain one said feeler-spindle or one said pin in one orientation opposite to the other.

2. The selector mechanism according to claim 1, wherein at least one column of said plurality of columns includes at least one bearing that extends in an axial direction perpendicular to said base surface.

3. The selector mechanism according to claim 2, wherein said bearing is limited by one said intermediate transverse stopping surface.

4. The selector mechanism according to claim 1, wherein said mobile extends along said profile, which is closed, and wherein said slots extend between an outer envelope geometric surface defined by the outer end transverse surfaces of said plurality of columns, and an inner envelope geometric surface defined by the inner end transverse surfaces of said plurality of columns.

5. The selector mechanism according to claim 4, wherein said closed profile is circular, and wherein said outer envelope geometric surface and said inner envelope geometric surface are cylindrical and coaxial.

6. The selector mechanism according to claim 1, wherein said profile is closed, and wherein said at least one projection is outside said mobile.

7. The selector mechanism according to claim 6, wherein each said projection is outside said mobile.

8. A timepiece comprising at least one horological movement, and at least one chronograph mechanism including at least one selector mechanism according to claim 1, controlled by control means accessible to the user.

9. The selector mechanism according to claim 1, wherein said at least one intermediate transverse stopping surface is a concave surface arranged facing inwardly towards a central axis of the selector mechanism.

10. The selector mechanism according to claim 1, wherein said two end transverse surfaces include an inner transverse surface and an outer transverse surface, an entirety of the outer transverse surface being positioned radially outside of an entirety of the inner transverse surface with respect to a central axis of the selector mechanism.

11. A clockwork column selector mechanism, comprising:

a mobile including a plurality of columns protruding above a base surface and separated by clearances, said columns and said clearances together forming slots extending along a profile, arranged to, in certain positions of said mobile, enable the insertion of a feeler-spindle or a pin into one said clearance in a transverse direction substantially normal to said profile and substantially parallel to said base surface, and to, in other positions of said mobile, stop a feeler-spindle or a pin on a transverse surface of a first column of said plurality of columns, wherein at least said first column includes at least one intermediate transverse stopping surface which is arranged to constitute a stop bearing surface of one said feeler-spindle or one said pin and enable a partial insertion of one said feeler-spindle or one said pin in the thickness of one said slot, and which is located, in said transverse direction, between the geometric envelopes of two end transverse surfaces which transversely delimit said first column, wherein each column of the plurality of columns that includes at least one said intermediate transverse stopping surface has a variable thickness in said transverse direction, and includes at least one projection arranged to retain said feeler-spindle or said pin of a clockwork mechanism arranged to cooperate with said selector mechanism, said projection including said intermediate stopping surface and a front stopping surface in the direction of said profile, and wherein said profile is closed, and wherein said at least one projection is inside said mobile.

12. The selector mechanism according to claim 11, wherein each said projection is inside said mobile.

13. A chronograph mechanism comprising:

at least one clockwork column selector mechanism, comprising a mobile including a plurality of columns protruding above a base surface and separated by clearances, said columns and said clearances together forming slots extending along a profile, arranged to, in certain positions of said mobile, enable the insertion of a feeler-spindle or a pin into one said clearance in a transverse direction substantially normal to said profile and substantially parallel to said base surface, and to, in other positions of said mobile, stop a feeler-spindle or a pin on a transverse surface of a first column of said plurality of columns, wherein at least said first column includes at least one intermediate transverse stopping surface which is arranged to constitute a stop bearing surface of one said feeler-spindle or one said pin and enable a partial insertion of one said feeler-spindle or one said pin in the thickness of one said slot, and which is located, in said transverse direction, between the geometric envelopes of two end transverse surfaces which transversely delimit said first column, wherein each column of the plurality of columns that includes at least one said intermediate transverse stopping surface has a variable thickness in said transverse direction, and includes at least one projection arranged to retain said feeler-spindle or said pin of a clockwork mechanism arranged to cooperate with said selector mechanism, said projection including said intermediate stopping surface and a front stopping surface in the direction of said profile, and wherein said chronograph mechanism includes a pin which is arranged to, according to the position of said mobile, in a start position corresponding to the running of the chronograph, remain at least partially in one said clearance between said two columns of said plurality of columns, or in a stop position corresponding to stopping the chronograph, cooperate in bearing engagement with one said projection, or in a reset position for resetting the chronograph, bear on an end transverse surface of one column of said plurality of columns.

* * * * *